United States Patent [19]
Schuchardt et al.

[11] Patent Number: 5,399,012
[45] Date of Patent: Mar. 21, 1995

[54] FULLY SELF-CLEANING REACTOR/MIXER WITH A LARGE USABLE VOLUME

[75] Inventors: Heinrich Schuchardt; Martin Ullrich, both of Leverkusen, Germany

[73] Assignee: Bayer Aktiengesellschaft, Germany

[21] Appl. No.: 921,244

[22] Filed: Jul. 29, 1992

[30] Foreign Application Priority Data

Aug. 9, 1991 [DE] Germany ............... 41 26 425.8

[51] Int. Cl.$^6$ ............... B01F 7/04; B29B 7/20
[52] U.S. Cl. ............... 366/97; 366/300; 366/301; 366/298; 366/313; 422/210
[58] Field of Search ............... 366/297, 298, 299, 300, 366/301, 296, 290, 291, 294, 295, 97, 85, 84, 91, 69, 71, 312; 425/204; 422/210, 209

[56] References Cited

U.S. PATENT DOCUMENTS

| | | | |
|---|---|---|---|
| 3,689,035 | 9/1972 | List | 366/85 |
| 3,734,468 | 5/1973 | Cheng et al. | 366/300 |
| 4,474,475 | 10/1984 | Moriyama | 366/97 |
| 4,556,324 | 12/1985 | Tynan | 366/301 |
| 4,650,338 | 3/1987 | List et al. | 366/97 |
| 4,752,135 | 6/1988 | Loomans | 366/297 |
| 4,950,081 | 8/1990 | List | 366/299 |
| 5,334,358 | 8/1994 | Schuchardt et al. | 366/313 |

FOREIGN PATENT DOCUMENTS

| | | | |
|---|---|---|---|
| 1199737 | 12/1961 | Germany . | |
| 4018069 | 6/1990 | Germany . | |
| 234917 | 10/1986 | Japan . | |
| 232828 | 9/1988 | Japan . | |
| 173457 | 1/1922 | United Kingdom | 366/301 |
| 04198 | 6/1988 | WIPO . | |

Primary Examiner—David A. Scherbel
Assistant Examiner—Tony G. Soohoo
Attorney, Agent, or Firm—Connolly & Hutz

[57] ABSTRACT

The invention relates to disc reactors with a large free usable volume which are kinematically self-cleaning, consisting of two or more parallel counterrotating shafts, on which toothed discs with scrapers, which are distributed over their circumference, are disposed, and a surrounding housing. The toothed discs are arranged perpendicularly to the axes of rotation in planes which are echeloned one behind the other such that they mesh with one another.

11 Claims, 12 Drawing Sheets

FULLY SELF-CLEANING REACTOR/MIXER WITH A LARGE USABLE VOLUME

The invention relates to disc reactors with a large free usable volume which are kinematically self-cleaning, consisting of two or more parallel counterrotating shafts, on which toothed discs with scrapers, which are distributed over their circumference, are disposed, and a surrounding housing. The toothed discs are arranged perpendicularly to the axes of rotation in planes which are echeloned one behind the other such that they mesh with one another.

The invention focuses on devices for treating fluids and cohesive loose materials in the chemical engineering field. The devices are fully kinematically self-cleaning and have a large free volume.

PRIOR ART

During the production and processing of plastics among other things, high-viscosity liquids must be treated by process engineering. Apparatuses are required in particular for mixing and evaporation. These must have a good mixing action and in the case of evaporation bring about a rapid renewal of the free surfaces.

Deposits of product on the walls of such mixers can lead to interference with the process. In deposits undesirable side-reactions are favoured because of the considerably increased residence time. This leads to contamination of the product. Deposits of product on the walls can be avoided by kinematic self-cleaning of the mixer. The object of self-cleaning is achieved, for example, by known two-shaft extruders rotating in the same and opposite directions, and also by single-shaft kneaders with axially oscillating motion. Their structural shapes have in common a small free useful volume. Only a small part of the total volume of such an extruder is available for the product.

A large free volume is, however, to be aimed at with a view to the minimizing of apparatus costs.

A large free volume is achieved by so-called disc reactors. In the single-shaft model the rotor of the disc reactor consists of a shaft on which are arranged axially staggered discs, which have scraper elements on their periphery which clean the greatest part of the casing wall. Typically, stationary scrapers are arranged on the casing wall, which are intended to clean the shaft and the discs.

The known types of disc reactors have in common a degree of cleaning (kinematically cleaned surface/total surface of the apparatus contacted by the product) of usually less than 70%. This is caused by the fact that in the one-shaft case the scraper elements are not cleaned all round and in the two-shaft case the discs also are only cleaned to a limited degree.

Progress was achieved by the reactor described in the German patent application No. P 4 018 069.7. In this case the cleaning degree was greatly improved. Since, however, the discs are staggered in the reactor described in this document, an unclean strip is left on the opposite housing wall. Moreover, the axial permeability, which is particularly necessary for evaporation processes, is low.

The object of the invention is to provide a reactor which is fully self-cleaning and has a large free volume.

The object is solved in that a multi-shaft mixer carries toothed discs which are engaged with one another on each shaft in axially echeloned planes, which discs in turn carry scrapers. The toothed discs are formed such that they clean one another over their circumferential area and the housing in their range. The scrapers clean one another over the circumference and the housing. The end faces of the scrapers and the toothed discs also clean one another. The end faces of the housing are cleaned by toothed discs.

An arrangement of scraping members which clean one another fully over the circumference is described in the patent application P 4 018 069.7. This has only been applied for disc reactors carrying axially staggered discs.

In the case of counterrotating systems, it is known that a point of one rotor describes a cycloidal curve in the reference system of the other rotor in a radial section.

From this it follows that a scraper as well as a toothed disc of a disc reactor is just completely cleaned kinematically when its periphery is bounded by the cycloidal curves which the peripheral points of the scraper elements of the other rotor describe.

Corresponding to the shape of the cycloidal curves, all surfaces facing outwards are convex, while the surfaces with a normal component towards the axis of rotation are concave.

A suitable arrangement of the scraping members is possible if all the scraping members are arranged such that their major extent forms an angle with the radius, and if in a radial section all the scraping members of one rotor convey outwards and all those of the other rotor convey inwards.

Thus it becomes possible that on entering the zone of engagement of the other rotor, the narrow sides of one scraper element clean the long sides of two scraper elements of the other rotor, while on leaving, the long sides of two scraper elements of the one rotor clean the narrow sides of two scraper elements of the other rotor. The tips of the scrapers clean the opposite shaft and the housing circumference.

If only outwards-delivering elements were arranged on one rotor and only inwards-delivering elements on the other rotor, it would be expected that the torque and consequently also the angle of twist of the shafts would be different over their axial length and consequently different clearances could arise over the length, to the extent of jamming.

This can be prevented if on each shaft elements delivering outwards and elements delivering inwards alternate in the axial direction.

The widely used involute-toothed gears are an example of largely self-cleaning toothed discs. However, these have a dead point at their flanks. When the two mutually cleaning teeth contact at this point, there is no relative speed. As a result, no self-cleaning takes place at the dead point. Any product which is close to the wall is more likely to accumulate in the vicinity of the dead point.

A solution can be reached by substantial undercutting at the tooth root just above the dead point. The tooth tip will then clean the tooth space. The lateral corners of the teeth of one rotor clean the other surface of the engaged rotor.

The scraping members are attached to the toothed discs by connecting each second scraper in a radial section to the teeth of the toothed discs lying in front of the sectional plane. The scrapers lying in between are connected to the teeth of the toothed disc lying behind the sectional plane.

An axial conveying action can be achieved by forming the scrapers or the toothed discs or both such that they are helically twisted around the rotor axis in their axial extent.

Improved mixing can be achieved by additional scrapers placed at a radius which is smaller than that of the outside diameter.

The object of the invention therefore is a disc reactor consisting of two or more counter-rotating parallel shafts, on which axially echeloned toothed discs, which are engaged with one another and have scraping members distributed over their circumference, are disposed, and a surrounding housing, characterised in that in a radial section all the limiting areas of a scraper are contacted by scrapers of an engaged rotor or by the surrounding housing, that in a radial section the major extent of the scraping members forms an angle with the radius, that in a radial section all the scrapers of one rotor convey outwards, while the scrapers of an engaged, counter-rotating rotor all convey inwards, that in a radial section all the limiting areas of a scraper whose normal vector has a component pointing away from the axis of rotation are convex, while all the areas of a scraper whose normal vector has a component pointing towards the axis of rotation are concave, and that each second scraper is connected to the toothed disc lying in front of the sectional plane and the remaining scrapers are connectd to the toothed disc lying behind the sectional plane.

A preferred embodiment of the disc reactor is characterised in that the teeth are undercut in the tooth root, that the tooth tips contact the tooth root of the engaged disc, while the lateral corners of the teeth contact the other engaged tooth areas, and that the tooth tips and the housing wall contact one another.

The term contact implies the smallest possible approach of the above-mentioned parts of the reactor which can be achieved with regard to the manufacturing tolerances, so that these parts can slide past one another without obstructing the rotation of the shafts.

An embodiment of the disc reactor with rotors which are rotationally symmetrical n times is preferred.

In order to achieve a large free volume, the axial diameter of the rotor must be small in relation to the outside diameter. When the rotors are rotationally symmetrical, an outside radius which is greater than ¾ of the centre distance is possible when the speed of rotation is the same and each toothed disc has 2 to 8 teeth, there is a velocity ratio of 2 to 3 with 3 teeth on the toothed discs of the slower rotating rotors and 2 teeth on the toothed discs of the faster rotating rotors, there is a velocity ratio of 3 to 4 with 4 teeth on the toothed discs of the slower rotating rotors and 3 teeth on the toothed discs of the faster rotating rotors.

In a special embodiment a conveying action along the axes of the reactor can be achieved by forming the scrapers such that they are spirally twisted in their axial extent.

In a preferred embodiment of the disc reactor outwardly and inwardly conveying scrapers alternate in the axial direction on a rotor.

The scraping members may be angularly staggered on the discs, when viewed in the axial direction, in order to equalize the driving torques.

The description of the invention is explained in detail in the following in the light of the accompanying drawings, in which.

EXAMPLES

Figure 10:
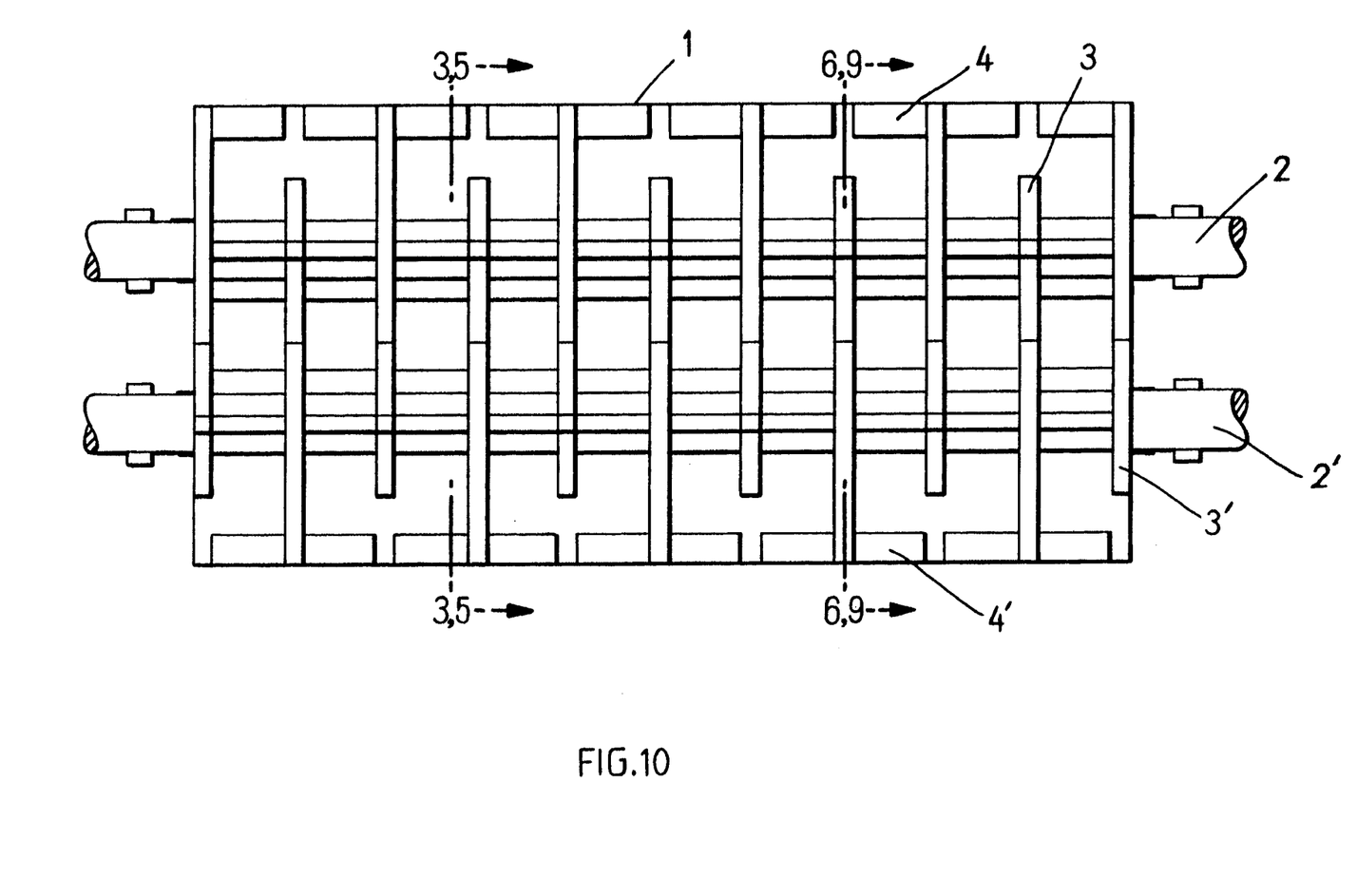
FIG. 10 shows the basic structure of a disc reactor according to the invention.
Figure 11:
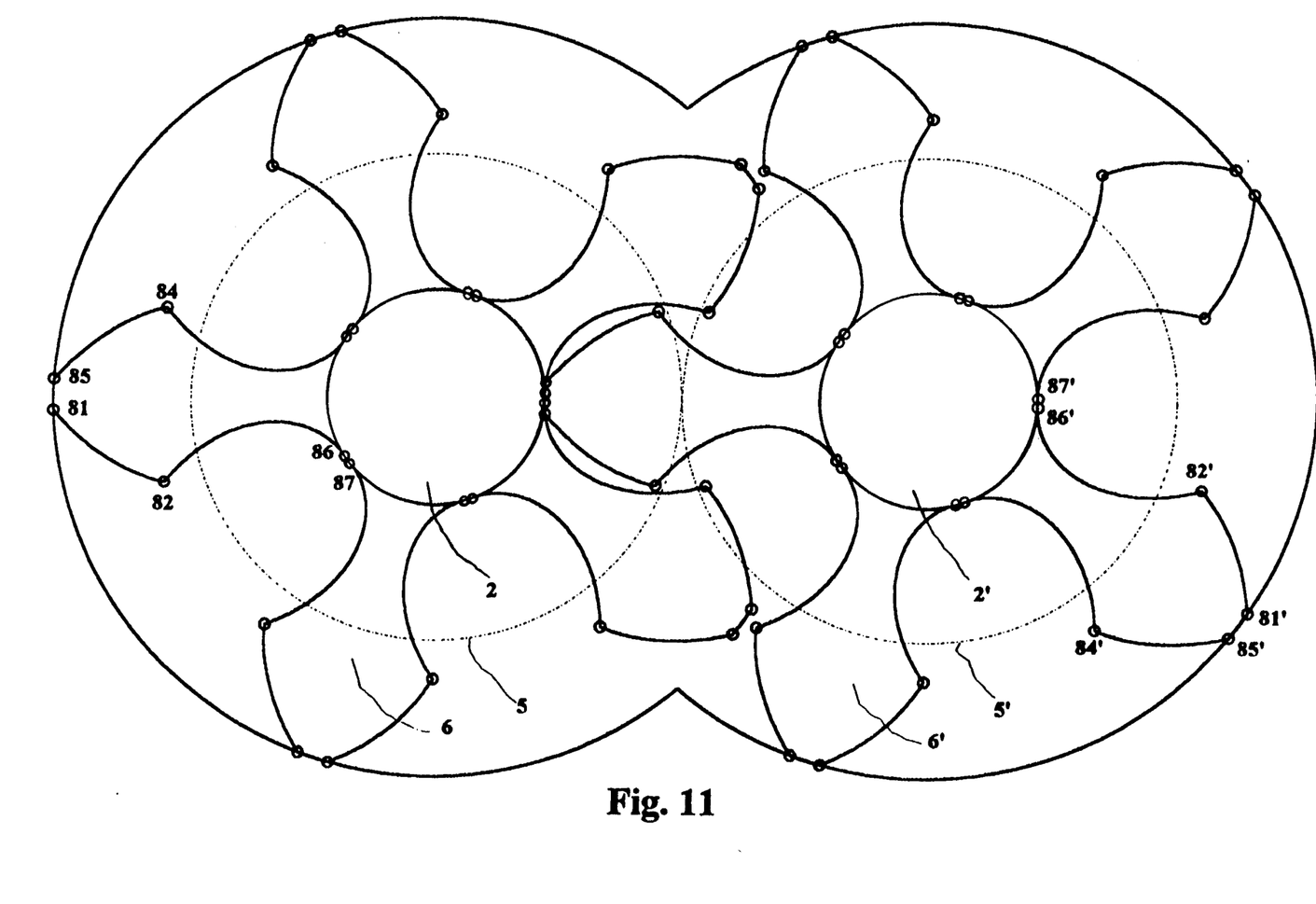
FIG. 11 is a view similar to FIG. 8 illustrating the circles 5,5'.
Figure 12:
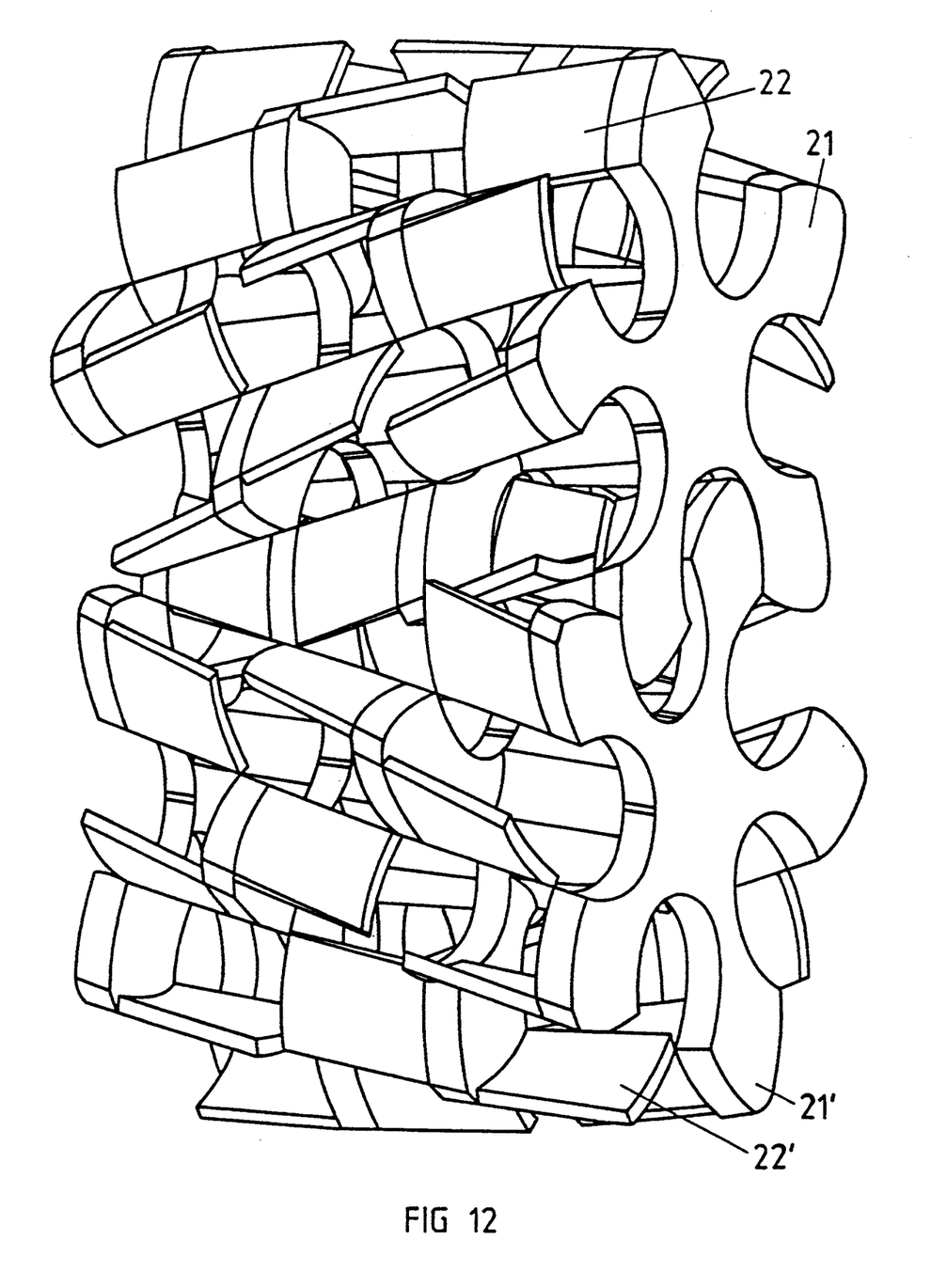
FIG. 12 shows a disc reactor wherein the toothed discs and scrapers are helically twisted around the rotor axis.

FIG. 10 shows the basic structure of a multi-shaft disc reactor.

Radial sections through the scraping members 4 and 4' or through the toothed discs 3 and 3' are crucial for an understanding of the kinematics. Sections corresponding to the section A-B from FIG. 10 and sections corresponding to the section C-D from FIG. 10 are therefore shown in FIGS. 6 to 9 and FIGS. 3 to 5, respectively.

EXAMPLE 1

Figure 1:
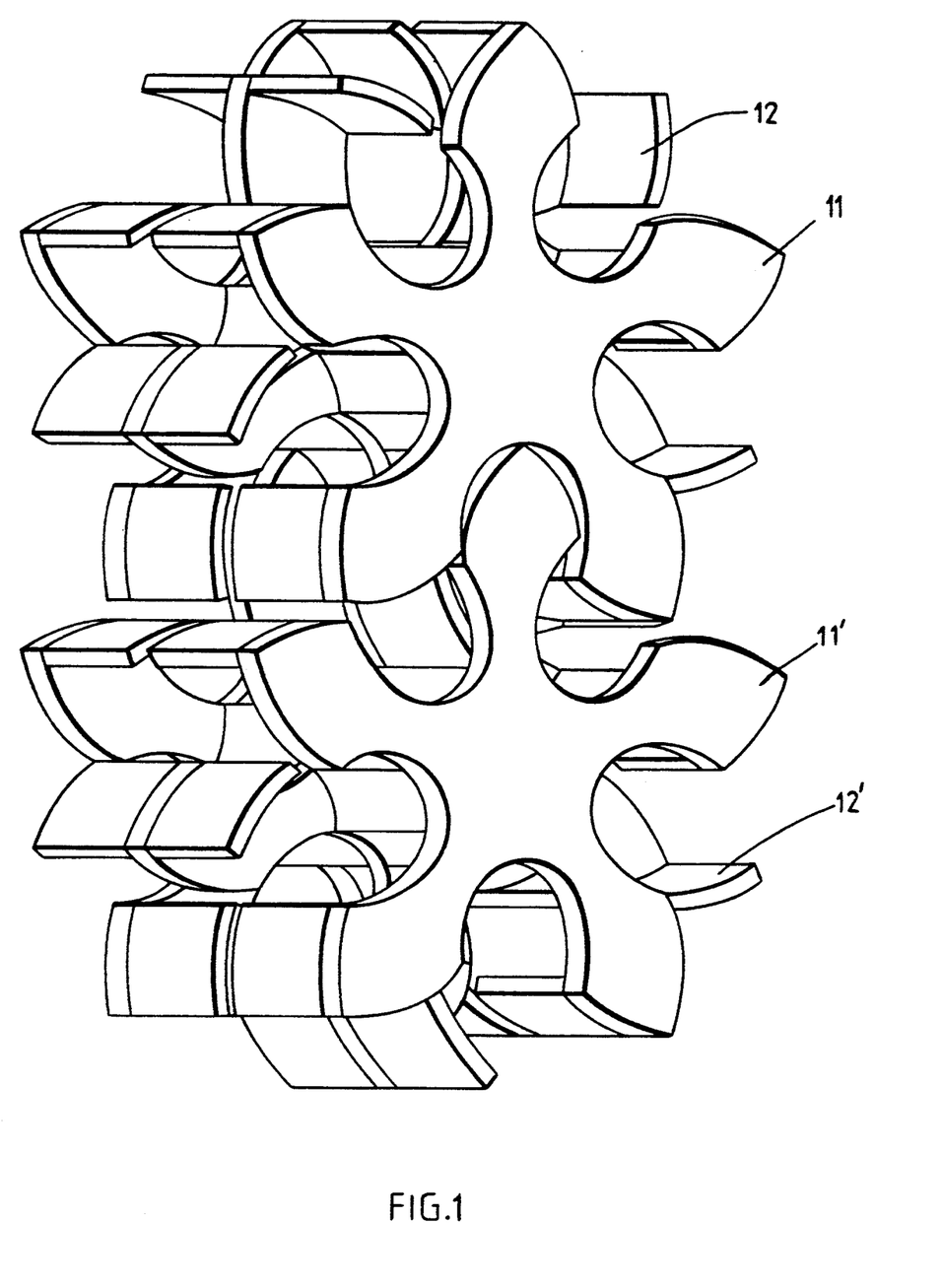
FIG. 1 shows a section of a disc reactor according to the invention in which all the scrapers of a rotor convey in the same direction.

FIG. 1 shows the structure of part of a disc reactor according to the invention, in which all the scrapers 12' of one rotor convey outwards and all the scrapers 12 of the other rotor convey inwards.

The rotors are rotationally symmetrical in order to equalise the torques. The driving torques are minimised by making the scraping members as narrow as possible.

Figure 6:
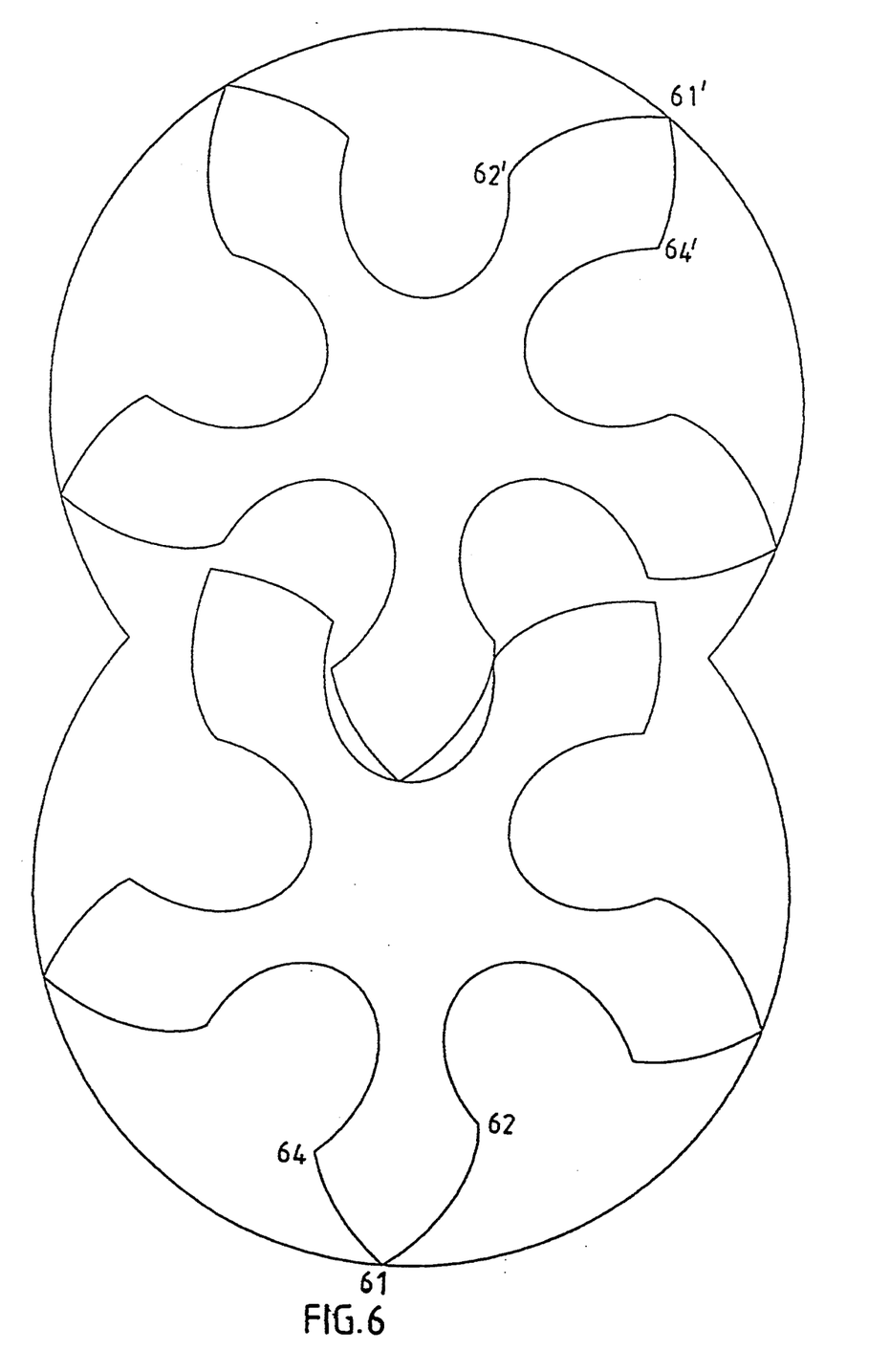
FIG. 6 is a radial section through the toothed discs of the disc reactor according to FIG. 1.

FIG. 6 is a section through the toothed discs 11, 11' of the reactor from FIG. 1.

The areas 62-61 are cleaned by the tooth edges 62', the areas 62-64 by the tooth tips 61' and the areas 64-61 by the tooth edges 64'. Similarly, the areas 62'-61' are cleaned by the tooth edges 62, the areas 62'-64' by the tooth tips 61 and the areas 64'-61' by the tooth tips 61. The housing wall is cleaned by the tooth tips 61 and 61'.

Figure 7:
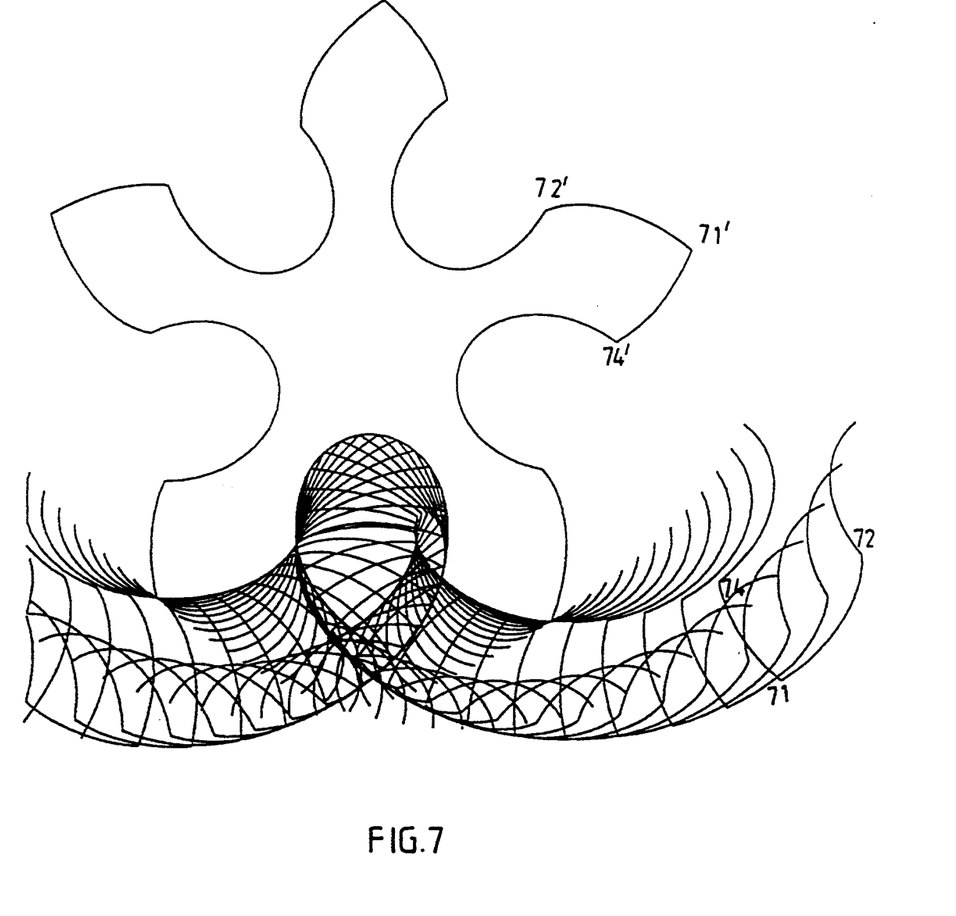
FIG. 7 shows the movement of a tooth of a toothed disc of the disc reactor according to FIG. 1 relative to the other rotor in stroboscopic photographs.

FIG. 7 shows the movement of a tooth 71-72-74 relative to the other rotor in stroboscopic photographs during half a revolution.

EXAMPLE 2

Figure 2:
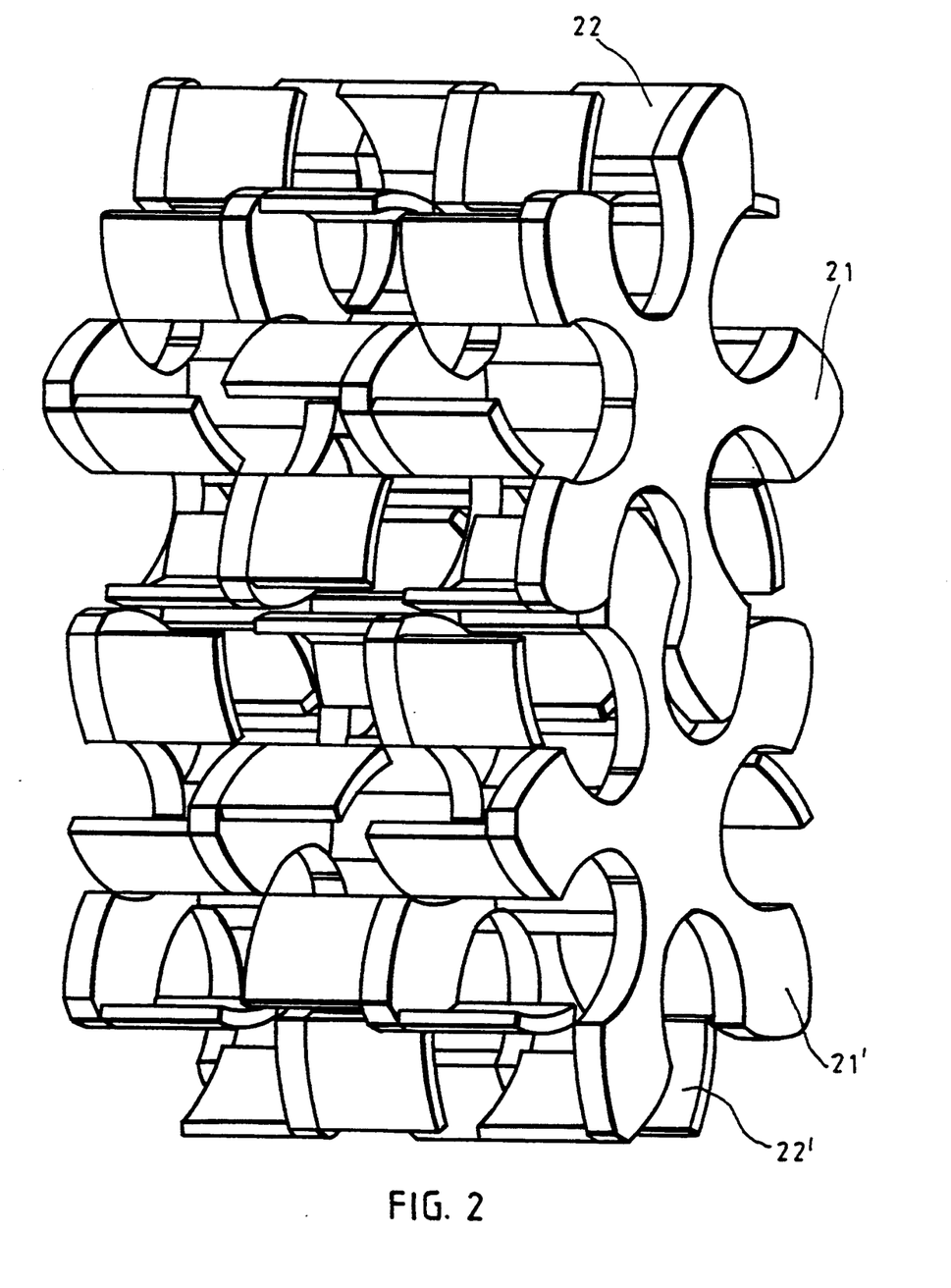
FIG. 2 shows a section of a disc reactor according to the invention in which axially successive scrapers of a rotor convey in different directions.

FIG. 2 shows the structure of part of a disc reactor according to the invention, in which outwardly and inwardly conveying scrapers alternate in the axial direction on a rotor. This results in equal torsional moments in the two shafts and thus no varying clearances over the axial extent.

The rotors are rotationally symmetrical in order to equalise the torques. The driving torques are minimised by making the scraping members as narrow as possible.

Figure 8:
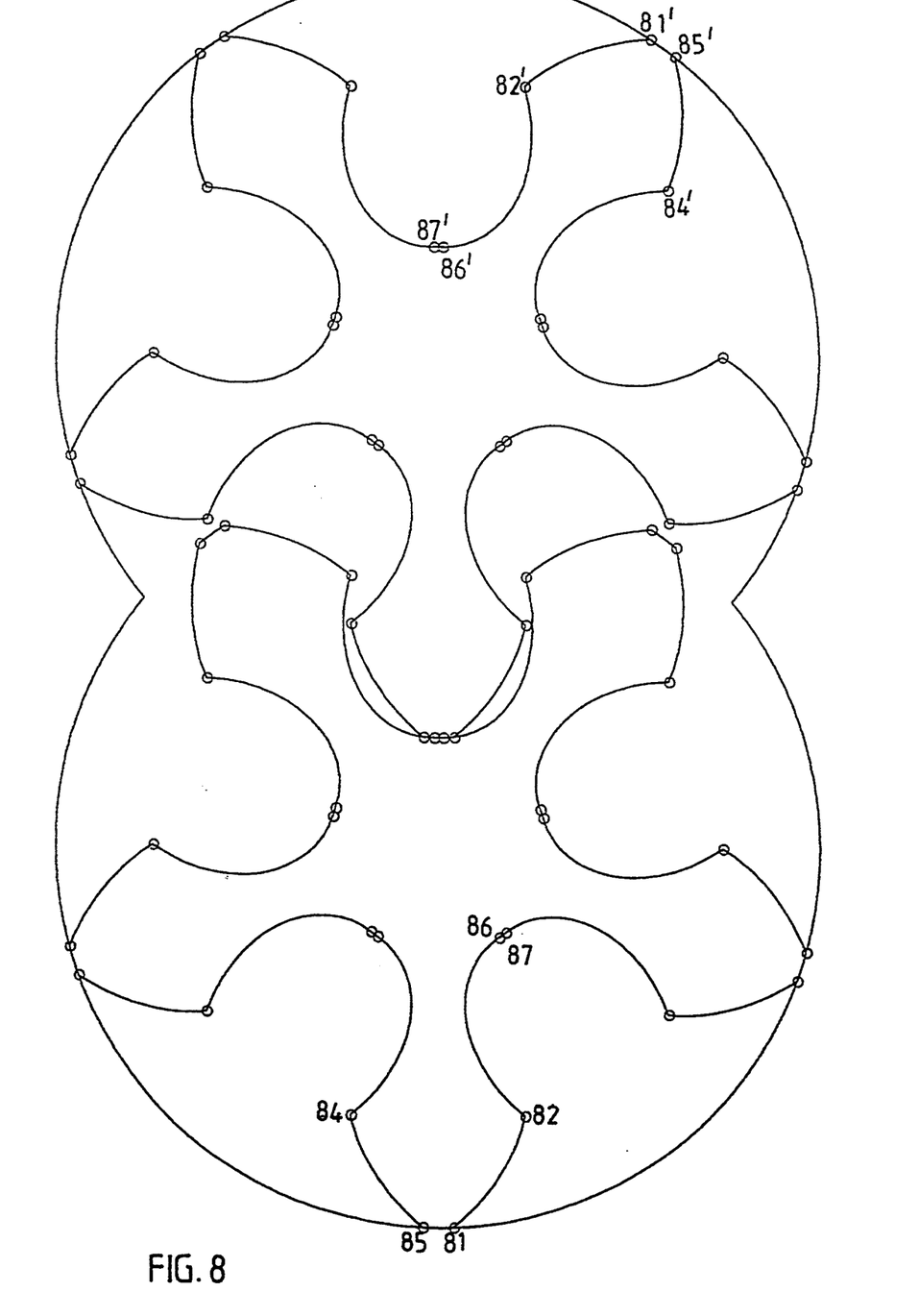
FIG. 8 is a radial section through the toothed discs of the disc reactor according to FIG. 2.

FIG. 8 is a section through the toothed discs 21, 21' of the reactor from FIG. 2.

The areas 81-82 are cleaned by the edges 82', the areas 84,87 by the edges 85', the areas 82-86 by the edges 81', the areas 86-87 by the areas 81'-85' and the areas 84-85 by the edges 84'. The 81-85, 81'-85' and the housing clean one another.

Figure 9:
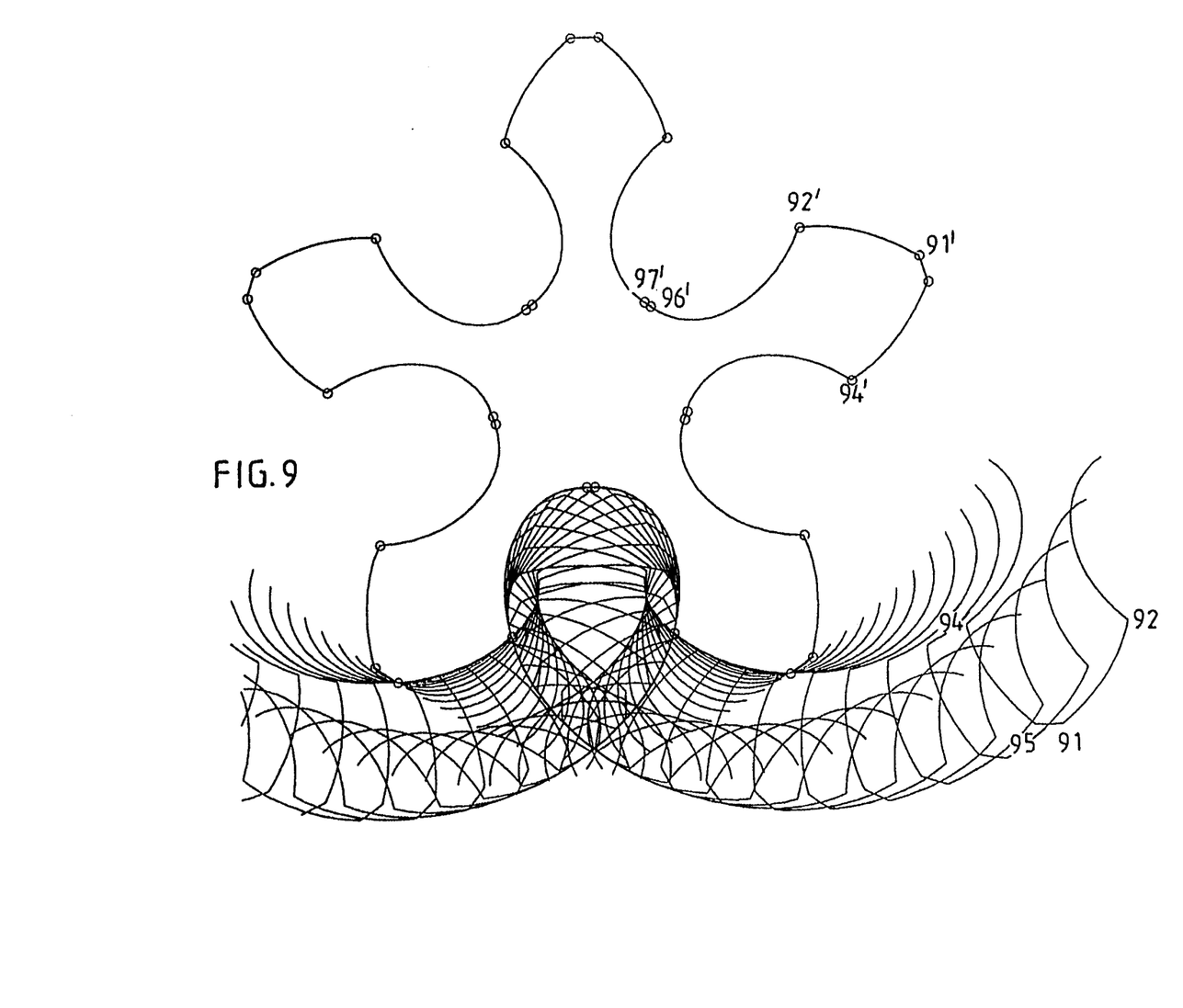
FIG. 9 shows the movement of a tooth of a toothed disc of the disc reactor according to FIG. 2 relative to the other rotor in stroboscopic photographs.

FIG. 9 shows the movement of a tooth 92-91-95-94 relative to the other rotor in stroboscopic photographs during half a revolution.

Figure 3:
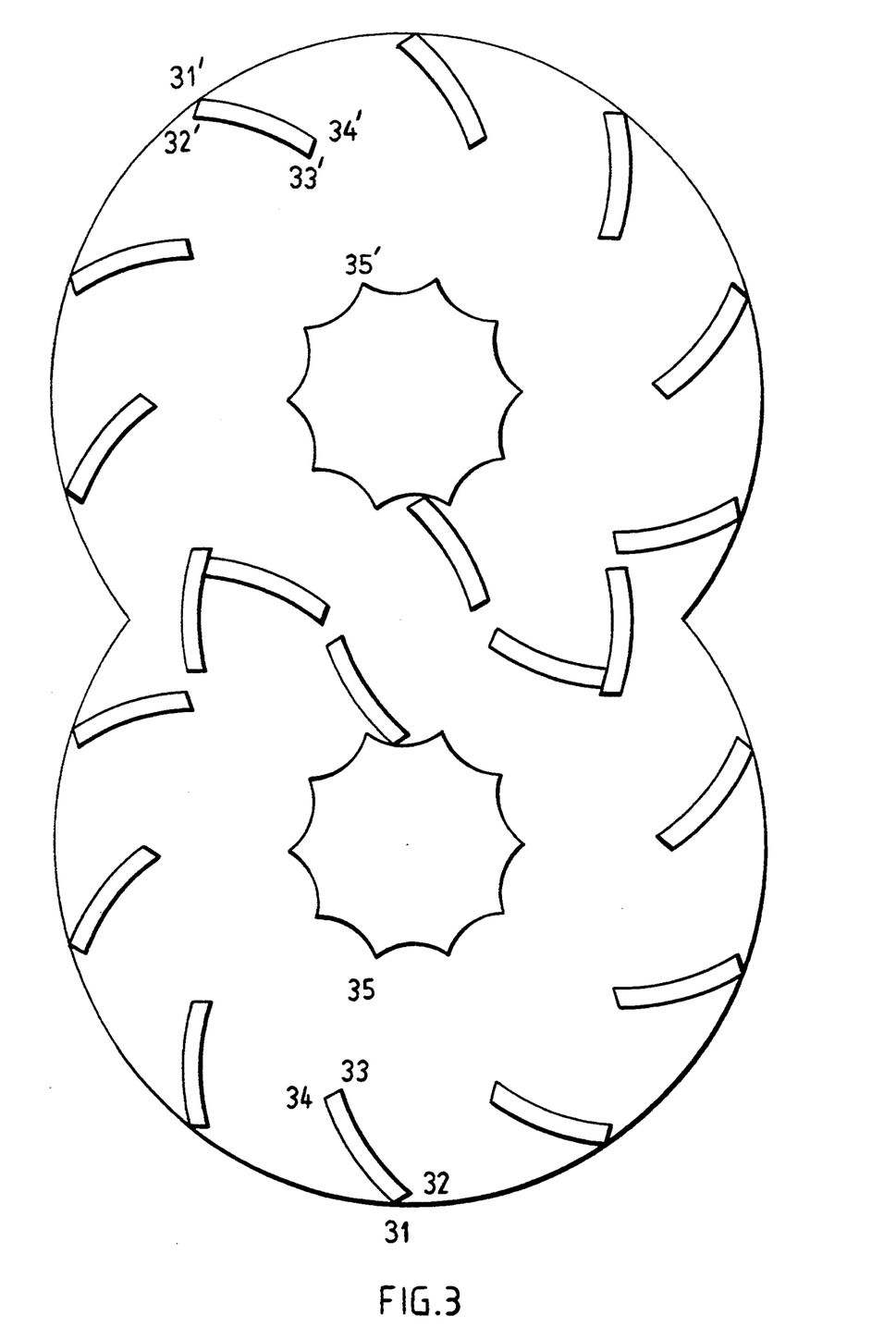
FIG. 3 is a radial section through the scraping members of the disc reactors from FIGS. 1 and 2.

FIG. 3 is a section through the scraping members 12, 12' of the reactor from FIG. 1 or 22, 22' from FIG. 2.

The areas 31-32 are cleaned by the edges 32', the areas 32-33, 33-34 and 35-35 by the edges 31' and the areas 34-31 by the edges 34'. The edges 31, 31' clean the housing wall.

Figure 4:
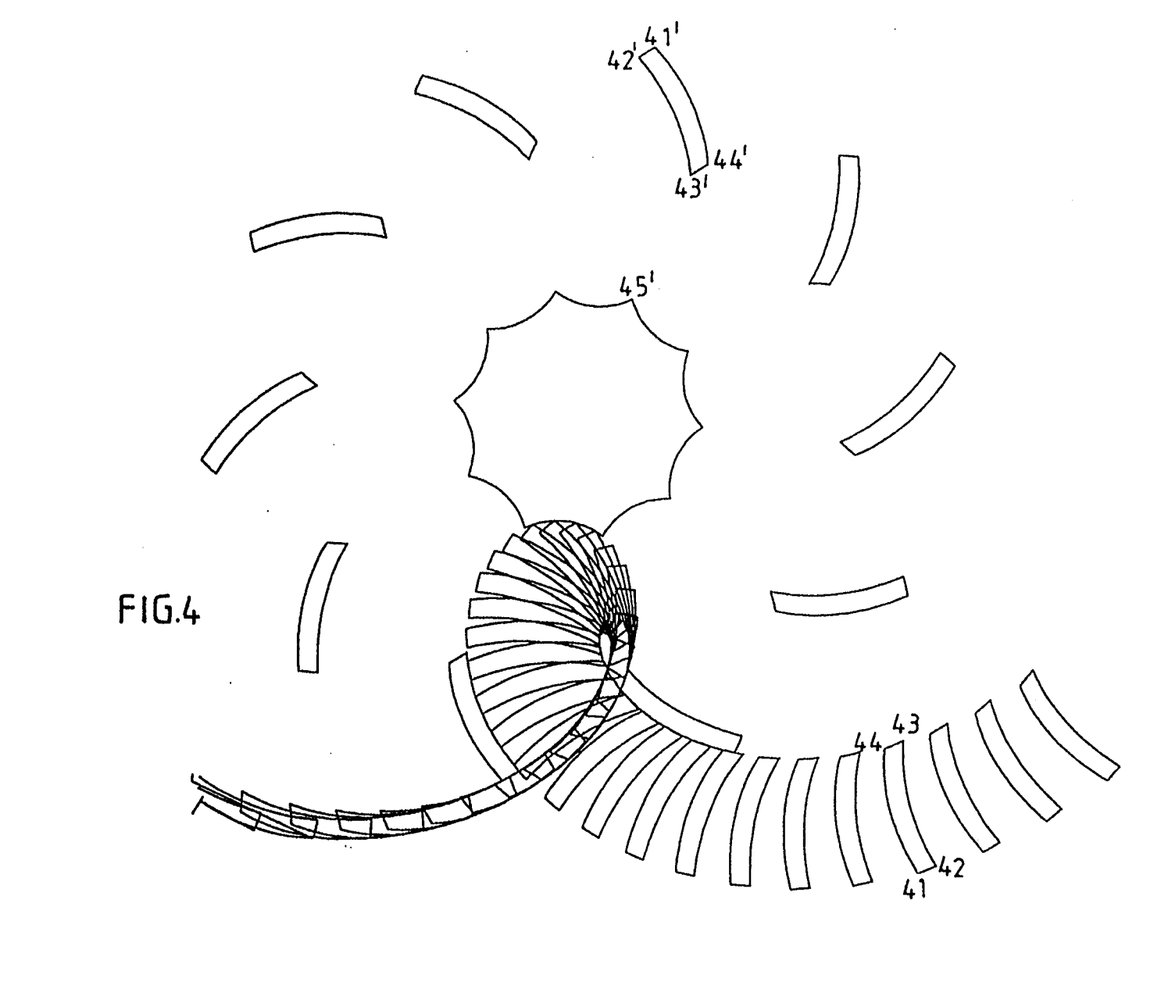
FIG. 4 shows the movement of a scraper of one rotor of a disc reactor as in FIGS. 1 and 2 relative to the other rotor in stroboscopic photographs.

FIG. 4 shows the movement of a scraper 41-42-43-44 relative to the other rotor in stroboscopic photographs during half a revolution.

Figure 5:
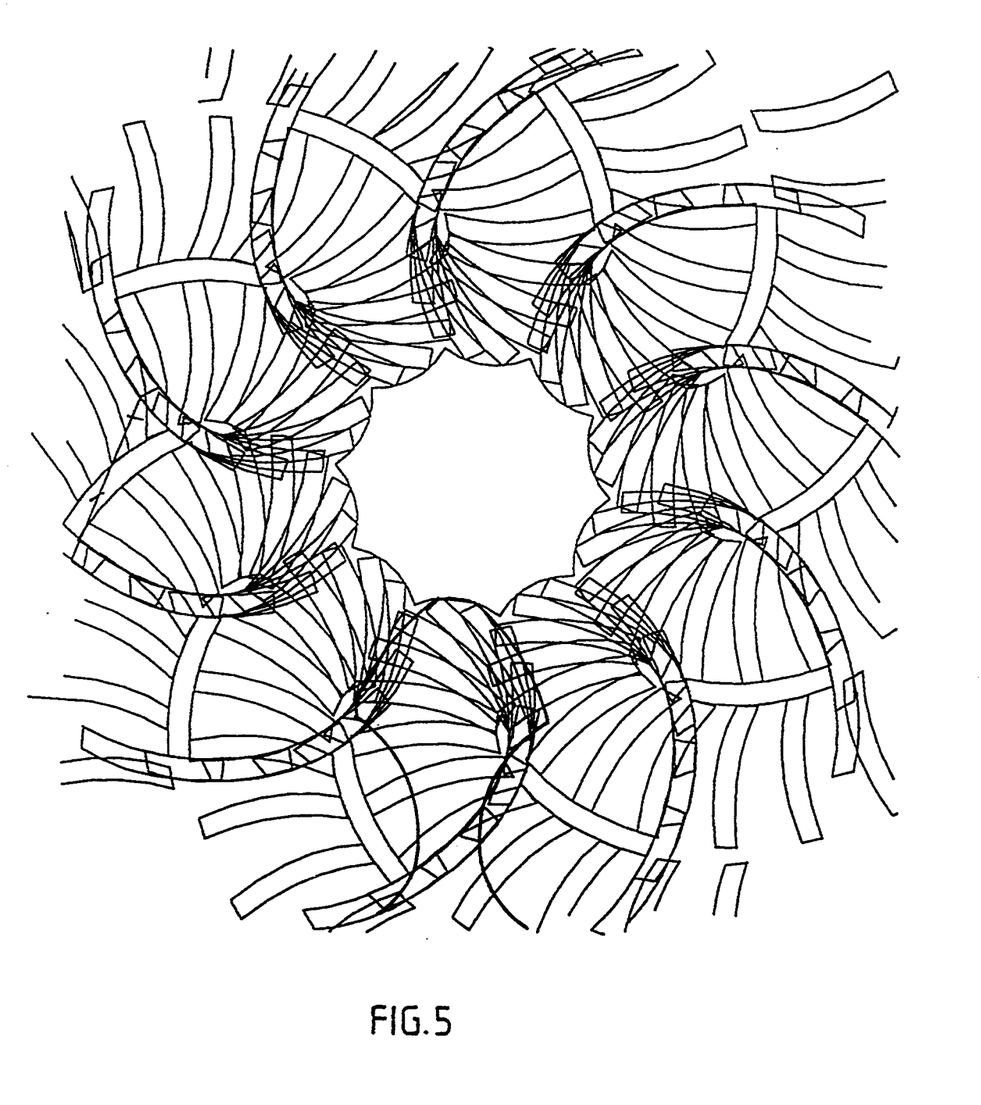
FIG. 5 shows the movement of all the scrapers of one rotor relative to the other rotor of a disc reactor as in FIGS. 1 and 2 in stroboscopic photographs.

FIG. 5 shows the movement of all the scrapers of one rotor relative to the other rotor. It is obvious that the end faces of the toothed discs 11, 11' from FIG. 1 and 21, 21' from FIG. 2 are completely cleaned.

We claim:

1. A disc reactor comprising:
   a surrounding housing;
   two or more parallel, axially directed, counter-rotating shafts disposed in said housing; each said shafts having respective groups of intermeshing toothed discs spaced apart and consecutively mounted on said shafts; each disc including a plurality of circumferentially spaced apart radially extending teeth, and scrapers; each scraper extending along an axial direction having a first end fixed to one of the tooth discs, and a second end of each scraper pointing to a circumferential space between said teeth of a consecutively mounted toothed disc on the same shaft; said scrapers further having surfaces wherein any radial section the surfaces of the scrapers are either epicycloids or circles around the center of rotation of the shaft, and every second scraper of one shaft lying in the same radial section is connected to the axially preceding toothed disc, while the other scrapers are connected to the axially consecutively mounted disc, wherein all surfaces of the scrapers perpendicular to the shafts are wiped by toothed discs, all other surfaces of the scrapers of one shaft is wiped by scrapers of the other shaft.

2. A device as claimed in claim 1, wherein, in at least the region inside the pitch diameter, the teeth of a toothed disc are undercut in the tooth root,
   the tooth tips contact the tooth root of the engaged toothed disc,
   the tooth tips and the housing wall contact one another,
   and the corners of the teeth contact the other engaged tooth areas.

3. A device as claimed in claim 1, wherein outwardly and inwardly conveying scrapers alternate in the axial direction on a rotor.

4. A device as claimed in claim 1, wherein the rotors are rotationally symmetrical having an n-fold symmetry of 2 to 8.

5. A device as claimed in claim 1, wherein the absolute angular velocities of two rotors are in a ratio of 2 to 3 and the toothed discs have 3 or 2 teeth, respectively.

6. A device as claimed in claim 1, wherein the absolute angular velocities of two rotors are in a ratio of 3 to 4 and the toothed discs have 4 or 3 teeth, respectively.

7. A device as claimed in claim 1, wherein the rotors rotate at the same absolute angular velocity, and that the toothed discs have from 2 to 8 teeth.

8. A device as claimed in claim 7, wherein the toothed discs have from 3 to 5 teeth.

9. A device as claimed in claim 1, wherein the scrapers or the toothed discs or both are helically twisted around the rotor axis in their axial extent.

10. A device as claimed in claim 1, wherein the scraping members are angularly staggered on the discs, when viewed in the axial direction.

11. A device as claimed in claim 1, wherein additional scrapers are disposed at a radius which is smaller than the outside radius.

* * * * *